United States Patent [19]

Matros et al.

[11] Patent Number: 4,877,592

[45] Date of Patent: Oct. 31, 1989

[54] METHOD OF CATALYTIC CLEANING OF EXHAUST GASES

[75] Inventors: Jury S. Matros; Viktor A. Chumachenko; Ljudmila J. Zudilina; Alexandr S. Noskov, all of Novosibirsk; Evgeny S. Bugdan, Novosibirskaya, all of U.S.S.R.

[73] Assignees: Institut Kataliza Sibirskogo Otdelenia Akademii Nauk SSSR; Spetsialnoe Konstruktorsko-Technologicheskoe Bjuro Katalizatorov S Optnym Zavodom (Skib Katalizatorov), both of Novosibirsk, U.S.S.R.

[21] Appl. No.: 239,956

[22] PCT Filed: Jun. 2, 1987

[86] PCT No.: PCT/SU87/00066

§ 371 Date: Jun. 2, 1988

§ 102(e) Date: Jun. 2, 1988

[87] PCT Pub. No.: WO88/02660

PCT Pub. Date: Apr. 21, 1988

[30] Foreign Application Priority Data

Oct. 17, 1986 [SU] U.S.S.R. .............................. 4131464
Oct. 17, 1986 [SU] U.S.S.R. .............................. 4131459

[51] Int. Cl.$^4$ ..................... B01J 8/00; C10H 23/00; C01B 31/18
[52] U.S. Cl. ................................ 423/245.1; 423/247
[58] Field of Search .................. 423/245 S, 247, 245.1

[56] References Cited

U.S. PATENT DOCUMENTS 4,366,668  1/1983  Madgavkar et al. ................ 423/247
4,410,499  10/1983  Aiken et al. ......................... 423/247

*Primary Examiner*—Gregory A. Heller
*Attorney, Agent, or Firm*—Burgess, Ryan & Wayne

[57] ABSTRACT

The method of catalytic cleaning of exhaust gases from organics and carbon monoxide consists in that an exhaust gas is passed through a bed of deep oxidation catalyst. The process is carried out with a temperature of 250°–700° C. The catalyst is made up of two parts. The exhaust gas is passed through a first part of the catalyst bed, stirred and passed through a second part of the catalyst bed. The stirring is continued until the temperature drop in the stream of the gas which is being cleaned is not over 50° C. at the entrance into the second part of the catalyst bed, and the flow of the gas is reversed at regular intervals during the cleaning.

2 Claims, No Drawings

METHOD OF CATALYTIC CLEANING OF EXHAUST GASES

FIELD OF THE ART

The invention relates to the techniques of cleaning industrial and ventilation gases discharged into the atmosphere and has specific reference to the methods of catalytic cleaning of exhaust gases from organics and carbon monoxide. Resolving the problem of protecting the atmosphere from toxic air pollutants, it may be of utility in the catalytic cleaning of exhaust gases in various industries.

PRIOR ART

There are known a number of methods of cleaning exhaust gases, which resort either to the adsorption or absorption of the toxic matter by a solid or liquid sorbent or to converting this matter into harmless substances. In most cases the conversion of toxic organics and carbon monoxide into safe compounds is accomplishes through the agency of deep oxidation. Deep oxidation involves oxidation of toxic matter to carbon dioxide and water vapours. The oxidation is performed in a bed of granular catalysts at a temperature which is higher than that at which the reaction of oxidation begins (250°–450° C.). Since most of the exhaust gases have a temperature of 100° C. or even less, they must be heated to the temperature at which the reaction would begin. To that end, the exhaust gases can be either mixed with hot flue gases or heated up by the cleaned exhaust in a heat exchanger.

Nowadays, most catalytic cleaning plants employ a combined method of heating. The sequence of events in this case is as follows. The exhaust gas to be cleaned is fed into a heat exchanger where it is heated due to a heat transfer with the cleaned gas before this is exhausted. Further heating up is effected by adding to the gas which is being cleaned some hot flue gases produced by burning fuel. The hot gas at a temperature enabling the reactions of oxidation of the toxic pollutants to take place is passed through a bed of catalyst where its temperature increases due to the fact that these reactions are exothermic ones. The gas cleaned on the catalytic bed is passed through a shell-and-tube heat exchanger where it heats up the incoming gas which is being cleaned and then is exhausted into the atmosphere (cf. 'Termicheskie Metody Obezvrezhivaniya Otkhodov', Khimiya, 1975, Leningrad, pp. 111-118).

This method requires bulky and complicated heat-exchanging equipment for its implementation and is costly, for extra fuel is needed for heating up the gas which is being cleaned. The burning of extra fuel is practically avoidable only if the total amount of the organics in the incoming gas is over 4 or 5 $g/m^3$. If this content is less than 4 $g/m^3$, the heating up of the incoming gas by a hot flue gas produced by burning fuel is indispensable and leads to the formation of toxic oxides of nitrogen. Generously surfaced heat exchangers seem to be an alternative to burning extra fuel but the heat losses into the atmosphere significantly increase in this case. The known method is also difficult to adapt to processing gases with a pollutant cotent varying with time. The answer can be found by introducing automatic control of the process of burning extra fuel.

In an attempt to overcome these disadvantages, a number of other methods have been suggested based on non-steady process of cleaning discharge gases from toxic pollutants. They have been realized by passing the gas to be cleaned through a bed of catalyst a number of times in succession, reversing each time the direction of gas flow (SU,A, No. 849594).

The cleaning of gases by the non-steady process renders the catalytic reactors less metal-intensive by a factor of 2 to 5 and eliminates the need in fuel if the pollutant content of the gas cleaned is over 1 $g/m^3$. Gases in varying amounts and of varying composition can be effectively processed by virtue of a significant heat capacity of the catalytic reactor.

The cleaning process by the non-steady method is accomplished as follows. A bed of catalyst interposed between two layers of inert material is heated up to a given temperature (250°–500° C.) together with the inert material. The gas to be cleaned is passed from a reversing valve through the first layer of inert material and heats there up due to direct contact. The heated gas enters the bed of catalyst where the reactions of oxidation of the pollutants take place accompanied by a liberation of heat.

On passing the bed of catalyst, the clean gas enters the second layer of inert material where it cools down before being exhausted into the atmosphere via a reversing valve. After a certain period of time, the direction of gas flow is reversed. The reversing valves are arranged so that the gas to be cleaned enters now the layer of inert material where the heat of the clean gas was accumulated during the previous cycle, before passing into the bed of catalyst and the layer of inert material which was the inlet one. After that, the clean gas is exhausted into the atmosphere via the corresponding reversing valve. The direction of gas flow is reversed regularly at given intervals varying between 10 and 100 min. so that a fraction of the heat liberated during the reactions of oxidation is absorbed by the layers of inert material and the catalyst. It will be noted that some areas of the inert material function as regenerative heat exchangers which provide for catalyst temperatures as high as 250° to 800° C. in treating exhaust gases with a low air pollutant content.

But the cleaning of exhaust gases by this method has its own problems. This refers before all to local overheating of the catalyst to a level exceeding its heat resistance. The catalyst bed heats up nonuniformly, being hotter at the axis of the reactor than at the walls thereof. This leads to thermal deactivation of the catalyst and shortens its service life. The known method also fails to effectively clean the gases with a total air pollutant content less than 1 $g/m^3$.

Further known is a method of cleaning gases containing air pollutants in insignificant amounts which is effected by introducing fuel directly into the incoming as (SU, A, No. 882056). The fuel added in this case, e.g. natural gas, increases the catalyst temperature to 550°–750° C., that is to a level which provides for the oxidation of the natural gas at a satisfactory rate but is too high for the oxidation of most organics (alcohols, solvents) which need only 300°–450° C., even on oxide catalysts. The overheating of the catalyst to 550°–750° C. owing to a continuous introduction of fuel (natural gas) shortens the service life of the catalyst to 12–16 months.

It is evident that the known methods lack effectiveness and are money-consuming because they shorten service life of the catalyst due to its overheating.

DISCLOSURE OF THE INVENTION

It is an object of the present invention to provide a method of catalytic cleaning of exhaust gases which is adaptable to treating discharges of variable volume and composition, including gases with an insignificant pollutant content, extends the service life of the catalyst and renders the final exhaust practically harmless.

In accordance with this and other objects the invention contemplates a method of catalytic cleaning of exhaust gases from organics and carbon monoxide at 250°–700° C. by passing the waste gas through a bed of deep oxidation catalyst and successively reversing the direction of flow of the incoming gas and the cleaned one whereby according to the invention the bed of catalyst consists of two parts and the waste gas is passed through a first part of the catalyst bed, stirred and passed through a second part of the catalyst bed, the stirring lasting until the temperature drop in the stream of the gas which is being cleaned is not over 50° C. at the entrance into the second part of the catalyst bed.

Suitable for use as deep oxidation catalysts are those based on precious metals (platinum, palladium) or oxide catalysts the active components whereof are oxides of copper, chromium and other metals or mixture of oxides.

The preferred range of temperatures during the process of cleaning is 250°–700° C. At 250° C. the exhaust gas undergoes cleaning by deep oxidation on a catalyst based on precious metals. At lower temperatures the cleaning is not as thorough as it should be and even such readily oxidizing pollutants as carbon monoxide or methanol may fail to enter the reaction under acceptable conditions. The upper temperature limit of 700° C. is specified taking into account the heat resistance of most granular catalysts suitable for deep oxidation. A temperature in excess of 700° C. changes the porous structure of the catalyst, reduces its contact surface and activity. Mechanical damage of catalyst pellets may take place eventually.

The recommendation to divide the catalyst bed into two parts stems from the necessity to stir the stream of the gas which is being cleaned. Even a small fraction of the catalyst bed which is separated from the rest gives rise to the effect of temperature equalization.

It is expedient to confine the stirring of the gas stream to the zone of maximum temperatures. In this case the effect of equalizing the temperatures at various areas of the catalyst bed will be a most notable one. To that end, it is preferred to divide the catalyst bed into two equal, or almost equal, parts by volume.

As already said, local temperature differences shorten the service life of catalyst. However, it has been proved experimentally that under the conditions of the known methods of cleaning areas of temperature difference spring up within intervals between 3 and 10 hours which are by far longer than the periods of reversing the direction of gas flow through the catalyst (10–120 min.). Obviously, the temperature differences cannot reach their maximum during such short intervals and are not detrimental to the process as a whole.

The approach according whereto the catalyst bed is divided into two parts eliminates nonuniformly heated catalyst areas from the bed. In fact, such areas do occur in the first part of the catalyst bed, being located in a plane at right angles to the direction of the incoming gas flow. The gas outflow from the first part of the catalyst is stirred using a fan, a double segmented grid or a mixing tube and passed through the second part of the catalyst where nonuniformly heated areas are in existence after the preceding feeding of the exhaust gas in the opposite direction.

To cope with its assignment of eliminating the nonuniformly heated catalyst areas, the gas fed into the bed must have a temperature which is the same at the axis of the bed and at the walls of the reactor. Unless this requirement is met and the difference in the temperature at the axis of the bed and at the walls of the reactor is over 50° C., no temperature equalization will occur in the catalyst during the successive passage of the gas through the second part. Local overheating may occur which would shorten the service life of the catalyst.

In cleaning exhausts with a total pollutant content less than 1 g/m$^3$, it is good practice to pass the gas through the deep oxidation catalyst bed in the presence of a hydrocarbon fuel added in an amount of 0.5 to 5 g/m$^3$ of the gas in order to cool down the catalyst bed and keep the cleaning as thorough as it can be. The fuel fed with the gas causes a gradual increase in the catalyst temperature. If fed continuoulsy, the fuel may heat up the catalyst to a temperature exceeding its heat resistance. If no fuel is fed with the gas at all, the cleaning cannot be as thorough as it should be under the acceptable conditions. Therefore, the fuel is admitted until the catalyst temperature reaches a preset value between 250° and 700° C. At this point the flow of fuel is interrupted and the gas alone is passed through the catalyst, lowering its temperature. On reaching a minimum value, the fuel flow is resumed and so on. If the amount of the fuel added is less than 0.5 g/m$^3$ of the gas, the heat losses into the surrounding will exceed the amount of heat liberated during the reaction and the cleaning will be not as thorough as it should be. A fuel content greater than 5 g/m$^3$ of the gas brings about a sharp rise in catalyst temperature and invites difficulties in monitoring and controlling the process. Local overheating, deactivation, and failure of the catalyst are likely to occur.

The proposed method of catalytic cleaning of exhaust gases compares favourably with the known nonsteady methods of catalytic cleaning in that it extends the service life of the catalyst by 20–40% and ensures a cleanliness of a 100% order. It also employs a more simple technique and equipment than the traditional one-way methods of feeding the gas and is adaptable to cleaning exhausts of variable compositions and volumes. The disclosed method needs no heat exchanger, being carried out in a single apparatus which is less metal-intensive by a factor of 2 to 5 than the equipment needed for the known methods.

The implementation of the disclosed method creates the prospect of cleaning gases containing air pollutants of intricate compositions. The method affords a cleanliness which is consistent with modern sanitary regulations and is practically not affected by the type of the deep-oxidation catalyst used.

All in all, the disclosed method is simple in its essence, requires simple equipment for its realization, provides for high effectiveness and long service life (up to 20–24 months) of the deep-oxidation catalyst used, offers good economy and is versatile being suitable for cleaning gases with any content of organics and carbon monoxide.

PREFERRED EMBODIMENT

The method of catalytic cleaning of exhaust gases can be realized as follows.

A gas to be cleaned is fed through a first part of a preheated bed of deep-oxidation catalyst where it heats up to a temperature bringing about an early oxidation of the pollutants followed by a deep oxidation as the temperature rises over the range between 200° and 700° C. The gas which is being cleaned is stirred so that the temperature drop in its stream is not over 50° C. at the inlet into a second part of the catalyst bed. The stirring is effected with the aid of a fan, a double segmented grid or a mixing tube. If the temperature drop is over 50° C., non-uniformly heated areas will arise in the catalyst bed which are detrimental to its service life. The stirred stream of gas is admitted in the successively-arranged second part of the catalyst bed where final cleaning takes place, and the clean gas is exhausted into the atmosphere. After a period of operation, the direction of gas flow is reversed so that the outlet part of the bed becomes the inlet one. Now the incoming gas enters first a more hotter part of the bed and heats there up before being stirred and fed into the second part of the catalyst bed which was formerly the first one. The cleaned gas is discharged into the atmosphere. The direction of gas flow is reversed at regular intervals.

When the pollutant content is less than 1 $g/m^3$, the cleaning is conducted with the addition of a hydrocarbon fuel from time to time. In this case, a gas to be cleaned is mixed with a hydrocarbon fuel added in a amount of 0.5-5 $g/m^3$, passed through the first part of a prehested catalyst bed, stirred so that the temperature drop is not over 50° C., passed through the second part of the catalyst bed and the clean gas is discharged into the atmosphere. The direction of gas flow is regularly reversed with the result that the catalyst bed temperature rises over the range between 250° and 700° C. The feeding of fuel is stopped when the temperature increases to a given point inside this range and is resumed when it decreases below another given point within the same range. The sequence of events is then repeated.

To cut catalyst requirements, the end faces of the catalyst bed can be built up, by analogy with the known methods, from an inert material.

For a better understanding of the disclosed method, a few practical examples are illustrated.

EXAMPLE 1

An outflow of air with a linear velocity of 0.6 m/s and at a temperature of 30° C. was cleaned from ethyl acetate present in an amount of 0.038 vol. % by being passed through a 0.8-m bed of copper-chromium catalyst with a bead size of 15 mm which was separated into two layers with a thickness of 0.4 m each. The polluted air was passed through the first layer, stirred with the aid of a double segmented grid and passed through the second layer of the catalyst bed, the stirring continuing until the temperature drop in the stream of the air which was cleaned was not over 5° C. at the inlet into the second layer.

The catalyst temperature was 500°-550° C., and the direction of air flow was reversed every 30 min. The cleanliness of the exhaust into the atmosphere was 99.93%. The service life of the catalyst was 20 months.

EXAMPLE 2

An outflow of air with a velocity of 0.4 m/s and a temperature of 80° C. was cleaned from carbon monoxide contained in an amount of 1.1 vol. % by being passed through a 0.3-m bed of platiniferous catalyst made up of 5×10 mm cylindrical pellets and separated into two layers of equal thickness. The process was conducted on the lines as in Example 1. The temperature drop was eqlized by stirring the flow of air between the two layers with a fan until it was 50° C. at the inlet into the second layers of the catalyst bed. The catalyst temperature varied between 250° and 270° C. The cleanliness of the exhaust into the atmosphere was 99.9%, and the catalyst stood fit for service for 20 months.

EXAMPLE 3

A flow of air with a velocity of 0.5 m/s and polluted with a mixture of solvents (dimethyl benzene, toluene, acetone) present in a total amount of 4 $g/m^3$ was cleaned in a 0.5-m bed of a copper-chromium catalyst separated into two layers with a ratio of 2:3 by volume. The process was conducted on the same lines as in Example 2. The catalyst temperature was 650°-700° C. The content of the pollutants in the discharge was 0.02 $g/m^3$ or, in other words, a cleanliness of 99.5% was obtained. The catalyst remained in service for 19 months.

EXAMPLE 4

An outflow of air polluted with a mixture comprising $0.09 \times 10^{-2}$ vol. % phenol, $3 \times 10^{-2}$ vol. % methanol and $9 \times 10^{-2}$ vol. % formaldehyde was cleaned by being passed through a 1.8-m bed of granular copper-chromium oxide catalyst separed into two layers each 0.9 m thick between which the air was stirred with a fan until the temperature drop was 5° C. at the inlet into the second layer, as in Example 1. The cleaning was accomplished with the addition of fuel in an amount of 2 $g/m^3$ of the air cleaned. The feeding of the fuel was stopped when the catalyst bed temperature rose to 650° C. and was resumed as soon as the temperature dropped to 550° C., and so on. A cleanliness of 99.5% was obtained, and the catalyst service life was 22 months.

EXAMPLE 5

A gas containing 21 vol. % oxygen, $4.2 \times 10^{-3}$ vol. % (0.2 $g/m^3$) dimethyl benzene, $3.9 \times 10^{-3}$ vol. % (0.1 $g/m^3$) acetone, the balance being nitrogen, was cleaned in a 1-m bed of copper-chromium catalyst separated into two layers with a ratio 2:3 by volume. The linear velocity of the gas flow was 1 m/s, and the cleaning was accomplished as in Example 4. Fuel in an amount of 5 $g/m^3$ was added to the gas flow when the catalyst temperature dropped to 380° C. and the fuel flow was stopped with the rise of the temperature to 700° C. A cleanliness of 99.5% was obtained, and the catalyst stood in service for 20 months.

EXAMPLE 6

A flow of air with a velocity of 1.2 m/s and containing carbon monoxide in an amount of 0.5 $g/m^3$ was cleaned by the technique described in Example 4. The platiniferous catalyst bed 1 m thick was separated into two equal layers. Fuel in an amount of 0.5 $g/m^3$ of the gas cleaned was added when the catalyst temperature decreased to 250° C. and its feeding was resumed when the temperature rose to 380° C. The cleanliness was 99.5%, and the catalyst lasted for 20 months.

INDUSTRIAL APPLICABILITY

The method of the invention may be used for cleaning the ventilation gases of painting and drying shops in mechanical industries from solvent vapours and for cleaning exhaust process and ventilation gases in chemical and petrochemical industries.

What is claimed is:

1. A method for the reversible flow catalytic oxidation of a gas stream containing organic compositions and/or carbon monoxide which comprises:
   (1) passing the gas stream through a first bed of oxidation catalyst to oxidize at least a portion of the organic composition and/or carbon monoxide;
   (2) mixing the gas stream passing from the first bed of oxidation catalyst so that the difference in temperature between the coldest portion of the gas stream and the hottest portion of the gas stream is not more than 50° C.;
   (3) passing the mixed gas stream through a second bed of oxidation catalyst to further oxidize the oxidizable materials in the gas stream; and
   (4) reversing the direction of flow of the gas stream wherein the second bed of oxidation catalyst becomes the first bed of oxidation catalyst and wherein the temperature of the catalyst beds is maintained in the range of 350° C. to 750° C.

2. A method as claimed in claim 1, wherein a gas containing air pollutants in an amount less than 1 $g/m^3$ is cleaned by being passed through the catalyst bed in the presence of a hydrocarbon fuel which is added periodically to the incoming exhaust gas in an amount of 0.5–5 $g/m^3$.

* * * * *